United States Patent [19]

Teschendorf

[11] Patent Number: 5,266,611

[45] Date of Patent: Nov. 30, 1993

[54] WATERBORNE EPOXY DERIVED ADHESIVE PRIMERS

[75] Inventor: Andrew F. Teschendorf, Suisun City, Calif.

[73] Assignee: The Dexter Corporation, Pittsburg, Calif.

[21] Appl. No.: 917,582

[22] Filed: Jul. 21, 1992

[51] Int. Cl.$^5$ .................. C08K 5/29; C08L 51/08
[52] U.S. Cl. .................... 523/416; 523/423; 525/530; 525/904; 428/416
[58] Field of Search .............. 525/455, 530, 904; 528/904; 523/416, 423; 428/416

[56] References Cited

U.S. PATENT DOCUMENTS

| | | | |
|---|---|---|---|
| 3,931,448 | 1/1976 | Parkinson | 428/451 |
| 4,105,613 | 8/1978 | Clope et al. | 428/460 |
| 4,355,122 | 10/1982 | Fan | 523/423 |
| 4,749,735 | 6/1988 | Dersch et al. | 524/424 |
| 4,999,134 | 3/1991 | Liedek et al. | 546/245 |
| 5,076,951 | 12/1991 | Miles | 252/79 |

Primary Examiner—Melvyn I. Marquis
Assistant Examiner—D. Aylward
Attorney, Agent, or Firm—George A. Skoler

[57] ABSTRACT

An aqueous structural adhesive bonding primer composition containing a water-dispersible, modified phenoxy resin, an amine-aldehyde resin and a catalyst for reaction between the resins. The primer may contain corrosion inhibitors, including a novel chromate-free inhibitor system.

17 Claims, No Drawings

WATERBORNE EPOXY DERIVED ADHESIVE PRIMERS

RELATED PATENT APPLICATION

This application contains disclosures related to the invention of commonly assigned copending application Ser. No. 07/876,015, filed Apr. 30, 1992, entitled "Waterborne Epoxy Derivative Composition," and copending application Ser. No. 07/876,016, filed Apr. 30, 1992, entitled "Corrosion Resistant Waterborne Adhesive Primers."

BRIEF DESCRIPTION OF THE INVENTION

This invention relates to waterborne crosslinkable, epoxy-derived, thermoplastic adhesive bonding primers compositions that are suitable for use in bonding to metal and other kinds of surfaces.

BACKGROUND TO THE INVENTION

Structural adhesive bonding primers serve three basic purposes: (1) they protect the adherend surface from being affected by the workshop environment; (2) they inhibit corrosion of the bonded surface during its service life; and (3) they provide a compatible surface to which the adhesive can bond for long-term strength. They should have excellent mar resistance, protect the adherend from re-oxidizing, and be readily cleaned prior to bonding using standard workshop procedures. Additionally, they should protect the adherend in a bonded structure during high humidity conditions; from salt corrosive environments; and withstand the effects of numerous fuels, hydraulic fluids, and lubricating oils. Standard industry tests include hundreds of hours at elevated temperatures or at 100% relative humidity or at exposure to salt fog (100% relative humidity and 95° F. (35° C.)) environment. Exposure tests for several days, both at ambient and elevated temperatures, to various fluids and chemicals are common modes of evaluation by industry. The primers should not adversely affect the performance of the bonding adhesive. Typical industry requirements for the combination of primer and adhesive are tensile shear strengths up to 41.4 Mpa (6,000 psi), peel strengths up to 11.34 N/mm (65 pounds per lineal inch), and long-term service (up to 6,000 hours) at elevated temperatures up to 450° F. (232° C.). These prerequisites for a suitable adhesive bonding primer must be generally met before the primer achieves commercial acceptance.

The corrosion resistance required of a structural adhesive bonding primer is quite high, particularly when compared to a coating composition that is applied to a substrate for non-structural purposes. A structural adhesive bonding primer is part of a composite structure. It is the first layer applied to the metal adherend. The next layer is the adhesive. It is put on the adherend for the purpose of joining an adhering surface to the adherend. This results in the formation of a structural composite.

The criticality of stress corrosion of structural adhesive bonds is the subject of Bascom, *Adhesives Age*, pages 28, 29-35, April 1979. In this article, the author notes:

> The most severe limitation to the use of structural adhesives is the susceptibility of the bond lines to attack by moisture. The effect of the moisture is generally considered a corrosion of the metal adherend, and evidence certainly exists to support this view. For example, in military operations in Southeast Asia, the seriousness of the problem was apparent from the extensive repair and refitting of aircraft caused by the delamination of aluminum skin and honeycomb structures.
>
> Presently, there is no clear understanding of the mechanisms involved in adhesive bond stress corrosion, nor are there any well established means of predicting bond durability under moist or wet environments. In fact, there is disagreement as to whether the primary attack is on the adhesive or the metal adherend. As for predicting bond lifetimes, there is no generally accepted test method for adhesive bond stress corrosion.

The function of a structural adhesive bonding primer is to aid in keeping moisture from the adhesive-adherend interface and enhance the adhesion between the adherend and the adhesive. That action serves to minimize the impact of corrosion by acting as a barrier to moisture and passivating the adherend's surface from the impact of moisture that does penetrate to the adherend.

In the evolution of structural adhesive bonding primers, their formulations generally relied on dilute solvent solutions of modified epoxy or phenolic resins. These resins are generally considered innocuous, both being extensively used in food containers. However, materials used to cure these resins in adhesive bonding primers, such as amines, amides and imidazoles, may not be as innocuous. Solvents in the formulations have stimulated wide environmental concerns. The volatile organic compounds (VOCs) emitted by their evaporation from the adherend surface has been an ever increasing concern of industrial regulatory organizations.

Y. D. Ng and W. E. Rogers, in a paper entitled: "A Non-Chromated Water-Borne Adhesive Primer For Aerospace Applications" and given at the 33rd International SAMPE Symposium, during Mar. 7-10, 1988, discuss the environmental issues of adhesive primers. They point out that asbestos, at one time a favored raw material for adhesives, was virtually eliminated from the market since the early 1980's. They note that the aerospace industry has increased concern about using solvent-borne bonding primers.

> Their high VOC contents (80-90%) are a target that Regional Air Quality Management Boards, especially those in areas prone to substantial periods of air pollution, are aggressively seeking to regulate.

Illustrative of this concern are the strict air quality requirements mandated by the South Coast Air Quality Management District.[1] Though Y. D. Ng and W. E. Rogers indicate that most solvent-borne adhesive primers have little difficulty complying with 1987 SCAQMD Rule 1124 VOC limit for adhesive primers at 850 grams/liter, they fail to point out that typical epoxy/phenolic solvent-based adhesive bonding primers at about 10 percent solids emit VOCs into the atmosphere at levels approaching 800 grams/liter. Such VOC levels have been accepted because of the high performance the solvent based primers bring to the application. With ever increasing environmental concerns, such VOC levels are becoming unacceptable and there is a strong demand for epoxy based adhesive bonding primers that accommodate environmental concerns. SCAQMD has set the VOC limit for adhesive bonding primers at 250 grams/liter minus water, starting Jan. 1, 1993. This accords with the trend set for the coatings industry.

[1] South Coast Air Quality Management District (SCAQMD) has jurisdiction over air quality in the Greater Los Angeles Basis in southern California, U.S.A.

Such social reactions are stimulating the adhesive industry to find ways to reduce pollution by VOCs used as solvents in conventional adhesive bonding primers. Considerable emphasis exists to develop application technologies that reduce VOC emissions in adhesive bonding primer. A number of them have emerged to meet most but not all of the performance and application requirements, and at the same time meet emission requirements and regulations. One technology for overcoming the VOC problem involves the use of waterborne dispersions and solutions.

Clayton A, May, in his text entitled: *EPOXY RESIN Chemistry and Technology*, Second Edition, 1988, Published by Marcel Dekker, Inc., New York, N.Y., at page 766, makes the following characterization of waterborne coatings in general:

Waterborne industrial coatings are attractive because they usually contain only small amounts of solvent and can meet the newer air pollution regulations. In addition, they minimize fire and health hazards. On the other hand, aqueous systems lack the versatility and frequently the quality of solvent systems. Because of sensitivity to atmospheric conditions, they often must be applied under stringent controlled conditions of suitable temperature and humidity. Problems of corrosion often necessitate the use of stainless steel equipment. Some problems can be met by careful choice of solvents used in most waterborne coatings.

Waterborne coatings may be defined as coatings that contain water as the major volatile component and that utilize water to dilute the coating to application consistency. These coatings consist mainly, of resinous binder, pigments, water, and organic solvent. The type of pigmentation and the method of incorporation of the pigment vary widely. It is usually easier to incorporate pigments directly into the organic phase where conventional dispersion techniques can be applied . . .

Waterborne coatings can be made by dispersing or emulsifying the resin binder by use of added surfactants. This technique leads to opaque liquids. Because some hard resins are difficult or impossible to disperse directly into water, the resin sometimes can be dissolved in a water-immiscible solvent, and the resulting solution dispersed by the use of added surfactants. In this case, the solvent aids subsequent film coalescence. Surface activity or water dispersability also can be introduced into resin molecules by chemical modification of the resin by functional polar groups such as the carboxyl group.

Some very finely dispersed resins appear as clear as [sic] slightly hazy liquids; they frequently are described as soluble, solubilized, colloidal dispersions, microemulsions, hydrosols, etc. These resins contain built-in functional groups that confer water "solubility" upon the resin, and, normally, external added surfactants are not used.

Waterborne resin binders can be classified as anionic, cationic, or nonionic. Anionic dispersions are characterized by negative charges on the resin or by negative charges on the surfactant associated with the resin. Cationic dispersions have a positive charge on the resin or on the surfactant associated with the resin. Nonionic dispersions are those that have been dispersed by addition of nonionic surfactants or that contain a built-in hydrophilic segment such as polyethylene oxide which is part of the main chain of a relatively hydrophobic resin molecule.

Waterborne dispersions and solutions are to be contrasted with the water containing emulsion systems (oil in water varieties). In the latter case, the emulsion particles contain a concentration of highly volatile, water immiscible solvent plus a surfactant that keeps the emulsified particles suspended in the continuous water phase. During application, they rely on solvents to coalesce the deposited emulsion particles coupled with the surfactant, in order to form a continuous film that is free of pin holes and other defects. The waterborne dispersions and solutions can effectively address the VOC problem as well as the structural bonding issues.

Waterborne structural adhesive bonding primers introduce entirely different selection of resin and cure system, and introduce formulation problems not dealt with in solvent based adhesive bonding primer systems. For example, waterborne adhesive bonding primers are not as resistant to corrosive environments as are the more conventional solvent-borne adhesives. The conventional epoxy resins used in solvent-based systems are not water soluble or effectively water dispersible.

As May, supra, points out, epoxy resins are suitably modified to convert them into waterborne coatings. They may be modified to make suitable waterborne adhesive bonding primers. Their modification involves the conversion of the epoxy resin into a molecule that contains enough anionic, cationic or nonionic water compatibilizing groups so as to make the resulting resin water dispersible or compatible, as desired. The term "water-dispersible, modified epoxy resin," as used herein and in the claims, means a resin that is derived from the use of at least one compound that contains a vicinal oxirane group in its manufacture and is rendered either cationic, anionic or nonionic so as to be dispersible in water to form a stable coatable film therefrom onto a solid substrate. Such a resin may be soluble or dispersible in water either in the form of an emulsion or as a discrete dispersion.

Y. D. Ng and W. E. Rogers, supra, discuss the development of a waterborne structural adhesive bonding primer that uses the same multi-functional epoxy novolac resin as was used in "Hysol's EA 9205R (a 350° F.) [176.7° C.] service, solvent-borne adhesive primer." The less polar epoxy groups on the resin were transformed into more polar hydroxyl moieties. "Further treatment produced the cationic salt of the resin which provided the desired solubility and physical property characteristics." A combination of inhibitors are mentioned as replacements for chromates. They are stated to be proprietary. Properties of the proposed adhesive primer are discussed.

Fan, in U.S. Pat. No. 4,355,122, patented Oct. 19, 1982, describes the manufacture of a special class of water-dispersible, modified epoxy resin. This water-dispersible, modified epoxy resin is a linear polymer and hence is thermoplastic. It is a member of the class of resins known as "phenoxys." Fan describes his special phenoxy resin in the Abstract as a "water-borne thermoplastic polyhydroxyether resins . . . prepared by grafting carboxyl-containing vinyl monomers onto phenoxy resins with a free radical initiator and then converting the graft copolymer to an ionomer suitable for use as coatings or adhesives." As Fan points out, the thermoplastic polyhydroxyether resin, i.e., the phenoxy resin, that is subjected to grafting is characterized by the formula:

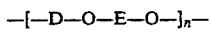

"wherein D is the radical residuum of a dihydric phenol, E is an [sic] hydroxyl containing radical residuum of an epoxide and n represents the degree of polymerization and is at least 30 and is preferably 80 or more." The phenoxy resins are epoxy modified resins, as the Fan patent shows. The phenoxy resins are described in the patent as being the reaction product of about 0.985 to about 1.015 moles of an epihalohydrin

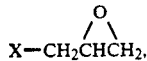

where X is halogen, with one mole of a dihydric phenol together with from about 0.6 to 1.5 moles of an alkali metal hydroxide, such as sodium hydroxide or potassium hydroxide generally in an aqueous medium at a temperature of about 10° C. to about 50° C. until at least about 60 mole percent of the epihalohydrin has been consumed. In commercial phenoxy resins, the dihydric phenol is bisphenol A [2,2-bis(4-hydroxyphenol)propane] and the epihalohydrin is epichlorohydrin. The resulting polymer may have the formula:

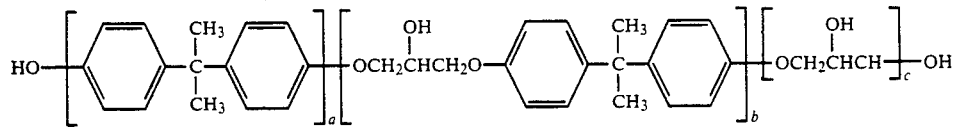

wherein either a or c is one or zero depending on whether bisphenol A or epichlorohydrin is used in molar excess, and b has the value of n defined above by Fan. The description of grafted phenoxy resins described at column 2, line 60 to column 7, lines 14, is incorporated herein by reference. Examples 1–10 of Fan are believed to illustrate preferred acrylic grafted resins that are rendered water soluble by converting the carboxy of the grafted acrylyl moiety to an hydroxyl amine salt by reaction with dimethylethylanolamine. A particularly preferred commercial resin of that class is UCAR Phenoxy Resin PKHW-35, sold by Union Carbide Chemicals & Plastics Company, Inc., Danbury, Conn. (U.S.A.), an amine-neutralized, carboxylated phenoxy resin that is colloidal in nature when dispersed in water. It would appear to be of that class of waterborne system that is characterized as a "microdispersion." It is characterized as having excellent emulsion stability from 0° C. to 55° C., without the need of a surfactant.

The performance advantages listed for UCAR Phenoxy Resin PKHW-35 are the following: excellent emulsion stability without added surfactant; hydroxyl and carboxyl functionality; "solution-type dry" behavior; high strength, stiffness, Tg, and ductility provided by the high molecular weight thermoplastic phenoxy backbone; tough and thermally stable films; crosslinks with standard melamine-formaldehyde resins to yield coating with superior properties, including outstanding impact resistance, flexibility, hardness, gloss, blush, and chemical resistance; highly compatible with a variety of thickeners and other system-enhancing additives; can be formulated as strippable coating; easy cleanup of processing equipment; and complies with FDA regulation 175.300 for food contact use. It is characterized as having excellent physical and chemical properties, and coupled with the excellent handling characteristics of this waterborne microdispersion, all of which makes the product, in the opinion of the supplie, a likely candidate for the following end-use: can coatings; coil coatings; wire coatings; specialty coatings; metal primers; laminating adhesives; flexibility modifier for rigid adhesives; and strippable coatings.

It is believed that grafting in PKHW-35 occurs at the tertiary hydrogen of the epichlorohydrin reaction product unit characterized in the phenoxy formula, as:

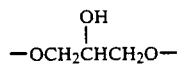

It is believed that PKHW-35 is made by grafting one or both of acrylic acid (or methacrylic acid) and methyl methacrylate as described in Example 5 of the Fan, U.S. Pat. No. 4,355,122, and worked up as described in Examples 6–10, except that the choice of solvent, conditions of reaction, concentrations, ratio of reactants are different in the manufacture of the commercial product.

Epoxy based adhesive bonding primers typically contain corrosion inhibitors. The most effective, and hence, the most widely used inhibitors are chromate (+6) salts such as potassium chromate, barium chromte, strontium chromate, zinc chromate and the like. They are usually part of the pigment composition of the formulation. Chromate pigments are listed as toxic substances under SARA Title III, Section 313.[2] They are listed as chemicals known to cause cancer or reproductive toxicity under California Proposition 65.[3] Their total or partial removal from any formulation is desirable, so long as the formulation possesses satisfactory corrosion inhibition. Due, in part, to this development, a need has arisen for non-chromate based corrosion inhibiting inhibitors. In particular, there is a need for non-chromate based corrosion inhibiting inhibitors for use in epoxy-derived adhesive bonding primers.

[2]Superfund Amendments, a Re-Authorization Act of 1986 (SARA), Title III, Sections, 311, 312 and 313, United States Federal Regulation.
[3]Proposition 65 (California Governor's list of "Chemicals known to cause cancer or reproduction toxicity"), State of California (U.S.A.) Regulation.

Corrosion occurs primarily as a result of electrochemical processes. At the interface between the substrate and the primer, an anodic surface is formed. Substrate ions, e.g. $Fe^0$ and $Al^0$ are oxidized, and go into solution. Electrons that are released from this reaction flow to the cathodic surface where they react with electrolytes such as water and salt solution. The formation of this circuit, and the subsequent chemical reactions, results in corrosion. The inhibitors act to prevent this corrosion through anodic passivation.

In order for anodic passivation to occur, the potential of the substrate must be increased enough such that substrate ions will not go into solution. The inhibitors work to cause this effect. Further, reduced pigment ions react with the soluble substrate ions to form an insoluble barrier on the substrate. This barrier prevents the movement of ions essential to the process of corrosion.

Chromates provide excellent corrosion protection and thus they are widely found in corrosion resistant adhesive primers. It follows that chromate replacements must approximate, or exceed, their performance. The industry typically assesses performance against standard testing procedures, such as ASTM B117-85[4] which provides procedures for testing corrosion resistance in compositions deposited on a substrate.[5] These measurements may be utilized in conjunction with an industry standard such as BMS 5-89.20.[6] However, due to the critical nature of the adhesive components in structural performance of the article of manufacture in which it is employed, such as an airplane component, many manufacturers require even higher standards.

[4]American Society for Testing and Materials, Philadelphia, Pa. [5]With these standards as a guideline, the following test is a typical one to sample corrosion resistance of inhibitors. The substrate surface is cleaned and prepared. The primer is subsequently applied. The primer is applied at a thickness between 0.2 and 0.4 mils, with a preference for 0.3 mils. Once the primer is applied, it is cured at a suitable temperature. The substrate is cut into 3'×3' squares. A scribe is etched into the substrate in the shape of an "X." The scribes are subjected to a 5% sodium chloride salt spray for 1,000, 2,000, and 3,000 hours. At the end of these periods, the squares are removed and the excess salt is scrubbed loose. Three relevant measurements are taken: number of pits in the scribe, undercutting, and percentage of the scribe that is shiny. These measurements may be compared with an industry standard. These standards are set out in BMS5-89, infra. [6]Boeing Material Specification.

As pointed out above, corrosion is a major issue with respect to structural adhesive primers. Consequently, a number of industries have strict corrosion inhibition standards when it comes to corrosion inhibition of structural adhesive bonding primers. The issue of corrosion inhibition is compounded in the case of waterborne structural adhesive bonding primers because of the formulation problems and the fact that they form a coating with different surface and structural characteristics.

The literature abounds with non-chromate corrosion inhibitors and many of them justly or unjustly are stated to be equivalent in performance to chromates. Typically, such claims are limited to solvent based coating systems and not to waterborne adhesive bonding primers where corrosion failure results in immediate structural delamination.

As noted above, the choice of resin for the manufacture of structural adhesive primers has been epoxy and phenolic resins. These resins are normally of low molecular weight therefore they possess a relatively high functionality to molecular weight ratio. Consequently, such resins end up producing cured products that have a high crosslink density. That crosslinked density contributes significantly to the solvent resistance, hardness, thermal resistance and other properties of the cured resins. The phenoxy resins are linear structures of relatively high molecular weight. They are thermoplastic. They can be made thermosetting because they possess functional hydroxyl groups along the backbone. However, such groups are secondary hydroxyl and they are within large bulky groups that can sterically hinder the reaction of the hydroxyl groups. Consequently, crosslinked phenoxy do not have comparable crosslinked densities to the conventional epoxy or phenolic resins. Phenoxy resins have not been a primary resin in aerospace adhesives. They may be used as an additive in conjunction with an epoxy resin but they do not replace the epoxy resin from the adhesive composition. It is not believed that phenoxy resins or waterborne versions thereof have been used in structural adhesive bonding primer compositions. Its properties are sufficiently different from those of epoxy and phenolic resins that they would not be regarded to have equivalent properties or be an obvious substitute for that application.

THE INVENTION

This invention relates to a low VOC waterborne structural adhesive bonding primer composition containing a water-dispersible, modified epoxy resin of the phenoxy type that meets the stringent requirements of the aerospace industry. The composition of the invention, when used as primers, such as on aluminum surfaces, (1) protects the adherend surface from being affected by the workshop environment, (2) inhibits corrosion of the bonded surface during its service life, and (3) provides a compatible surface to which the adhesive can bond for long-term strength. The compositions of this invention have excellent mar resistance, protect the adherend from re-oxidizing, and are readily cleaned prior to bonding using standard workshop procedures. The primers of the invention protect the adherend during high humidity conditions; from salt corrosive environments; and they withstand the effects of numerous fuels, hydraulic fluids, and lubricating oils. These primers meet the standard aerospace industry tests of hundreds of hours at elevated temperatures or at 100% relative humidity or at exposure to salt fog (100% relative humidity and 95° F. (35° C.)) environment. The primers of the invention have been satisfactorily evaluated in exposure tests for several days, both at ambient and elevated temperatures, to various fluids and chemicals commonly used in the industry. The primers of the invention do not adversely affect the performance of the bonding adhesive. For example, the combination of the primer of this invention and a compatible adhesive have withstood industry requirements for tensile shear strengths up to 41.4 Mpa (6,000 psi), peel strengths up to 11.34 N/mm (65 pounds per lineal inch), and long-term service (up to 6,000 hours) at elevated temperatures up to 450° F. (232° C.). Additionally, the aqueous primer compositions of the invention are suitably employed with 250° F. (121° C.) and 350° F. (176.7° C.) cure epoxy resin systems. Specific formulations of the low VOC waterborne structural adhesive bonding primer compositions of the invention are designed for 350° F. (176.7° C.) service, may be cured from 250° F. (121° C.) to 300° F. (149° C.) with optimum performance achieved with 270°-280° F. (132°-138° C.).

A feature of the composition is the combination of (i) water, (ii) a water-dispersible, modified epoxy resin of the phenoxy resin type, (iii) an amine-aldehyde resin and/or urea-aldehyde resin dispersed therein, and (iv) a catalyst therefor that allows (ii) and (iii) to interract and form a cured resin film, such that the VOCs is less than about 250 grams/liter minus the water content. The water-dispersible, modified epoxy resin of the phenoxy resin type, is characterized by the presence of one or more of anionic, cationic or nonionic functionality as defined above. The composition may contain other materials that aid in its coating and handling characteristics. In addition, the composition may contain high solids (viz., ≈20%) coupled with excellent storage and outtime stability.

More specifically, the invention relates to the use of a water-dispersible, modified epoxy resin of the phenoxy resin type characterized by the structural formula:

wherein D is the radical residuum of a dihydric phenol, E is a hydroxyl containing radical residuum of an epoxide and n represents the degree of polymerization and is at least 30 and is preferably 80 or more and E is substituted by a functional group that makes the phenoxy resin water dispersible. The phenoxy resins are epoxy modified resins, as the Fan patent shows. The phenoxy resins are described in the patent as being the reaction product of about 0.985 to about 1.015 moles of an epihalohydrin

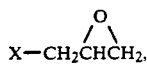

where X is halogen, (in which is provided the epoxy group that makes the resin fit the definition) with one mole of a dihydric phenol together with from about 0.6 to 1.5 moles of an alkali metal hydroxide, such as sodium hydroxide or potassium hydroxide generally in an aqueous medium at a temperature of about 10° C. to about 50° C. until at least about 60 mole percent of the epihalohydrin has been consumed. In commercial phenoxy resins, the dihydric phenol is bisphenol A [2,2-bis(4-hydroxyphenol)propane] and the epihalohydrin is epichlorohydrin. The resulting polymer may have the formula:

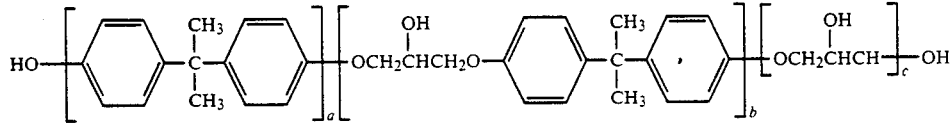

wherein either a or c is one or zero depending on whether bisphenol A or epichlorohydrin is used in molar excess, and b has the value of n defined above. Such polymer is rendered water dispersible according to Fan, supra, by grafting a potentially anionic, cationic or nonionic olefinically unsaturated group to the backbone of the polymer. As pointed out above, such grafting is believed to occur at the tertiary carbon atoms of the aliphatic moiety separating the residues of Bisphenol A in the polymer. The resulting polymer is believed to have the following structure:

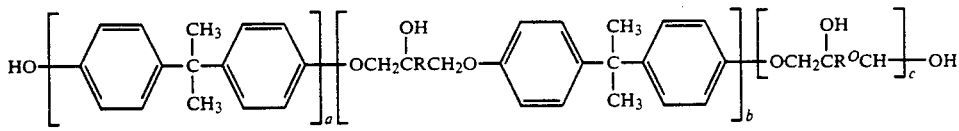

R and R⁰ are hydrogen or functional anionic, cationic or nonionic groups that render the polymer water dispersible when present in the polymer is sufficient amounts. Illustrative of suitable grafting olefinically unsaturated compounds are the acrylyl (in the context of this invention, acrylyl encompasses structures derived from acrylic or alkyl substituted acrylic) encompassed by the following formula:

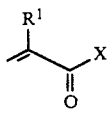

wherein $R^1$ is hydrogen or a lower $C_{1-4}$ alkyl group, preferably methyl, and X contains (i) an ionically bonded cationic or anionic group, having the charge c and where the number of acrylyl moieties will typically be equal to the value of c, or (ii) a nonionic group. Illustrative acrylyl compounds are the following:

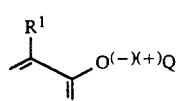

A

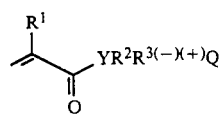

B

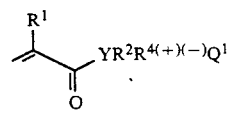

C

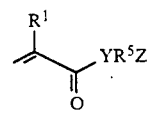

D

II.

wherein Q is a proton acceptor such as those described at col. 5, line 41 through col. 6, line 17 of the Fan patent; Y is either oxygen, sulfur or amino; $R^2$ is a divalent organic group, preferably alkylene, alkylene oxide, arylene, cycloalkylene, and the like; $R^3$ is a carboxy containing group such as alkanoic or carboxy; $R^4$ is an amine, ammonium, phosphonium, sulfonium, and the like group; $Q^1$ is a organo carboxyl, sulfonic, and the like group; $R^5$ is poly(alkyleneoxy); and Z is terminal

III.

alkyl or hydroxyl. These functional acrylics can be formed in situ, by simply grafting the acrylic or methacrylic (or other alkyl substituted versions) and reacting them with a base as taught by Fan, supra, or grafting them as taught by Fan and then converting the carboxylic group to the acid chloride with a chlorinating reagent such as thionyl chloride followed by reaction with the hydroxyl, mercapto or amino version of the functional group, or an intermediate leading thereto, as depicted in the acrylic monomers A, B, C and D, above, thereby forming the equivalent waterborne polymeric structure.

The water-dispersible, modified epoxy resin of the phenoxy type may contain water soluble ether solvents such as monomethyl ether of ethylene glycol, dimethyl ether of ethylene glycol, monoethyl ether of ethylene glycol, diethylene glycol, monomethyl ether of diethylene glycol, monomethyl ether of 1,2-propylene glycol, monomethyl ether of 1,3-propylene glycol, monoethyl ether of 1,2-propylene glycol, and the like.

The water-dispersible, modified epoxy resin of the phenoxy resin type is crosslinked by reaction with a melamine or urea aldehyde resin. The aldehyde is typically formaldehyde, acetaldehyde, propionaldehyde, butyraldehyde, and the like. The preferred aldehyde is formaldehyde. The preferred resin is one in which the aldehyde is alkyl capped to form the alkanol ether, e.g., —$CR^6HOR^7$ wherein $R^6$ is hydrogen or alkyl of about 1 to about 4 carbon atoms, preferably hydrogen, and $R^7$ is alkyl of about 1 to about 4 carbon atoms, preferably a methyl group. These resins may be A or B-staged resins, preferably they are in the A-stage of polymerization.

The water-dispersible, modified epoxy resin adhesive bonding primers of the invention are suitably employed on a variety of substrates, such as aluminum and steel. The primers perform effectively when applied to areas such as aircraft engine components.

DETAILED DESCRIPTION OF THE INVENTION

Structural adhesive bonding primers play a critical role in the formation of a composite structure, such as those used for aerospace applications. As mentioned above, there is no clear understanding of the mechanisms involved in adhesive bond stress corrosion and no well established means of predicting bond durability under moist or wet environments. As Bascom, supra, indicates, "there is disagreement as to whether the primary attack is on the adhesive or the metal adherend." So there is no way of predicting the capabilities of a given resin system to adequately function as a structural adhesive bonding primer.

Few resin systems meet the requirements of a structural adhesive bonding primer in aiding to keep moisture from the adhesive-adherend interface and enhance the adhesion between the adherend and the adhesive. As indicated above, the structural adhesive bonding primers of the invention fulfill a series of critical property requirements, making the composition an unpredictably selective resin system for this application.

In addition, there are few resins that are water-dispersible so as to allow formulation of a structural adhesive bonding primer that has a low VOC content and the required properties. The fact that certain commercial resins are water-dispersible is not a suggestion that they would meet the requirements of the invention in terms of structural adhesive bonding primer properties, even if the commercial resin was suggested for use as a metal primer. The latter characterizes a host of applications, and especially suggests the use of the metal primer for typical coating applications, not structural adhesive bonding primer applications where the property requirements are so stringent.

The prime component of the structural adhesive bonding primer of the invention is the water-dispersible, modified epoxy resin that in this case is of a phenoxy type that contains cationic, anionic and/or nonionic functionality. As indicated above, there is a family of such phenoxy resins suitable for use in the practice of this invention. The important aspect of the invention is that the water-dispersible phenoxy resin has the required hydroxyl functionality caused by the reaction of the epihalohydrin and the bisphenol A. Any carboxylic acid, amine and the like functionality that is present in the phenoxy resin is there to make the resin water-dispersible. Such groups can contribute to the interaction of other resins provided in the resin system of the primers of the invention. For example, carboxylic acid salt groups may contribute to the condensation reaction of any melamine-aldehyde or urea-aldehyde resin provided in the formulation.

The particularly preferred phenoxy resin is PKHW-35 discussed above. It may be employed with the aforementioned aldehyde resins to make a mixed resin having the basic properties for a suitable low VOC structural adhesive bonding primer. The amount of the water-dispersible phenoxy resin in the structural adhesive bonding primer may range from about 20 weight percent of the weight of the primer, to about 60 weight percent of the weight of the primer. Preferably, the phenoxy resin component may range from about 25 weight percent to about 55 weight percent, same basis. Most preferably, the phenoxy resin component ranges from about 30 weight percent to about 50 weight percent, same basis.

Suitable aldehyde resins are the amine resins, such as melamine-and urea-aldehyde resins. Particularly desirable amine-aldehyde resins are the melamine-formaldehyde resins and urea-formaldehyde resins. These resins are formed by the acid or base catalyzed reaction of melamine or urea with formaldehyde, and the molecular weight of the resin is dictated by the ratio of reactants, the catalyst chosen, the temperature of the reaction and the time of reaction. One way of controlling the reaction is to provide an alcohol in the reaction mixture. The alcohol serves to block the methylol groups that are first formed when the formaldehyde reacts with the amine. This reaction represses polymerization that may be overcome by catalyst and processing conditions to achieve the desired molecular weight. Of these types of resin, those in which the methylol groups are blocked by alkyl groups to form methylol alkyl ethers are preferred. Desirably, the alkyl groups contain from 1 to about 4 carbon atoms, the most preferred being methylol methyl ether groups. The choice of the blocking alkyl group (or choice of alcohol) contributes to the solubility of the amine resin in the phenoxy resin of choice. In the case of PKHW-35, the desired alkyl group is methyl. In the preferred embodiment of the invention, the degree of polymerization of the amine-aldehyde resin is relatively low, typically less than 2 monomer units in which the amine functionality is only substituted by methylol methyl ether groups. In the preferred embodiment, the degree of polymerization will range from about 1 to about 1.8, preferably greater than 1 to less than about 1.7. In the typical case, the amine will contain two methylol methyl ether groups per —$NH_2$ in the amine. In some cases, the amine may contain one methylol methyl ether group per —$NH_2$ and one methylol group per —$NH_2$ in the amine.

The choice of whether to use a urea-formaldehyde resin or a melamine-formaldehyde resin is simply a question of property preferences sought for the primer. Typically, the urea-formaldehyde resin will cure the water-dispersible phenoxy resin at a lower temperature than will a melamine-formaldehyde resin. They will also impart improved toughness but degrade elevated temperature strength. The melamine-formaldehyde resins contribute greater crosslinked density and therefore materially add to the elevated temperature strength of the resulting cured primer. Combination of the two different kinds of amine-aldehyde resins are often found desirable in order to effect a composite of properties.

The amount of each the amine-aldehyde resin used in formulating a primer of the invention may be as little as about 2 weight percent of the weight of the primer formulation to as much as about 10 weight percent, same basis. Usually, the amount of one or more of the resins ranges from about 3 weight percent to about 8 weight percent, same basis. Preferably, the amount of one or more of the resins ranges from about 3.5 to about 5 weight percent, same basis. Illustrative of the aldehyde-based resins are the Resimene ® melamine/urea formaldehyde based resins sold by Monsanto Company, St. Louis, Mo., U.S.A., Beetle ® urea-formaldehyde resins and Cymel ® melamine-formaldehyde resins, both sold by American Cyanamid Company, Wayne, N.J., U.S.A.

The performance of the water-dispersible, modified epoxy resin may be modified by admixture with aliphatic-type polyurethanes, where the aliphatic backbones are derived from aliphatic polyesters and polycarbonates. Illustrative of the aliphatic-type polyurethanes are NeoRez ® high solids waterborne urethane dispersion sold by ICI Resins US, Wilmington, Mass. U.S.A., and Baybond ® polyurethane dispersion sold by Mobay Corporation, Pittsburgh, Pa. U.S.A.

The phenoxy based water-dispersible, modified epoxy resin of the invention is commonly cured by reaction in the presence of an acid catalyst. Such catalysts are also effective in crosslinking the aldehyde type resins described above. Particularly suitable acid catalysts are the aromatic sulfonic acids, such as benzene sulfonic acid, toluene sulfonic acid, and the like, the amine blocked versions of these acid, and the like. Such amine blocking is the formation of amine salts where the amines are primary, secondary or tertiary alkyl amines, primary, secondary or tertiary alkanol amine, primary, secondary or tertiary amines where the substituents are a combination of alkyl and alkanol groups bonded to the amino nitrogen.

As noted above, structural adhesive bonding primers typically contain corrosion inhibitors. A variety of corrosion inhibitors are suitable in the practice of the invention. Though chromate corrosion inhibitors may be employed, the invention is most advantageously practiced with chromate-free primers. However, there are circumstances where a small amount of chromate would be acceptable because a chromate in such an instance is the only co-component of the inhibitor mixture that will provide the level of corrosion resistance necessary for the structural adhesive bonding primer application in question. In such a circumstance, the other inhibitors to the formulation serve to reduce the amount of chromate needed to achieve the desired level of corrosion resistance. The most effective, and hence, the most widely used inhibitors are chromate salts such as potassium chromate, barium chromate, strontium chromate, zinc chromate and the like. When used, they are usually part of the pigment composition of the formulation. To enhance the corrosion performance, where needed, of the primer of the invention, a small amount, based on the weight of the primer, of from about 0.05 to about 2.5 weight percent of one of the chromates that are typically used as a corrosion inhibitor, may be added to the formulation. A particularly preferred one is strontium or barium chromate. The chromate inhibitors may be used alone or in combination with the novel non-chromate inhibitor combinations described below.

The chromate-free, water-dispersible, modified epoxy resin primers of the invention exhibit excellent stability, adhesion, and application properties plus corrosion resistance performance that equals the comparable chromate containing water-dispersible, modified epoxy resin primer compositions.

The chromate-free corrosion inhibitor mixtures used in the primer composition comprise a number of different classes of materials, ranging from metal salts to straight carboxylic acids. The chromate-free inhibitors may be inorganic and/or organic in nature.

A desirable embodiment of the invention comprising a structural adhesive bonding primer composition, as aforedefined, containing a water-dispersible chromate-free corrosion inhibitor mixture of components I. and II. in which:

Component I. is at least one of:
(a) a zinc salt of a carboxylic acid of the formula:

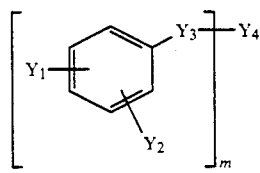

(b) zinc phosphate, and
(c) zinc molybdate,
wherein $Y_4$ is hydroxyl or a radical of the formula:

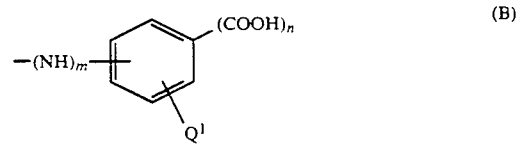

or

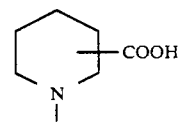

$Y_3$ is —CO— or —SO$_2$—, $Y_1$ is $C_1$-$C_8$-alkyl, $C_1$-$C_8$-alkoxy or halogen when $Y_4$ is other than hydroxyl, carboxyl when $Y_4$ is hydroxyl, or hydrogen when $Y_4$ is

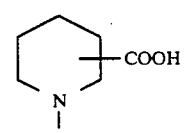

or $Q^1$ is nitro, or m is 2, $Y_2$ is hydrogen, $C_1$-$C_8$-alkyl, nitro, hydrogen or halogen, $Q^1$ is hydrogen, nitro or halogen, m and n are each 1 or 2;
and Component II. is at least one other and different corrosion inhibitor from the group consisting of:

i) (2-benzothiazolylthio)succinic acid, and ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof. The mixtures of components I. and II. inhibit the corrosion of the water-dispersible, modified epoxy resin adhesive primer at the adherend surface.

The invention relates to water-dispersible, modified epoxy resin primer composition, as aforedefined, in which component II. represents a variety of combinations of inhibitors such as:

1. (2-benzothiazolylthio)succinic acid combined with the I. component;

2. a mixture of (2-benzothiazolylthio)succinic acid and calcium silicate on an amorphous gel of silica combined with the I. component;

3. a mixture of a precipitated calcium silicate, zinc iodide, and lithium borate combined with the I. component;

4. a mixture of a precipitated calcium silicate, a calcium strontium zinc phosphosilicate, zinc iodide, and lithium borate combined with the I. component;

5. a mixture of zinc iodide and manganese (III) acetate combined with the I. component.

6. bismuth nitrate combined with the I. component;

7. cerium chloride combined with the I. component;

8. cerium molybdate combined with the I. component;

9. sodium thioglycolate combined with the I. component;

10. calcium strontium zinc phosphosilicate combined with the I. component; and 11. a water-dispersible mixture of niobium oxide and cerium molybdate combined with the I. component.

With respect to component I., it comprises at least one but not more than two of the cited inhibitors of that category. The first corrosion inhibitor of the component I. category is (a) a zinc salt of a carboxylic acid of the formula:

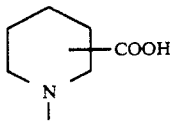

wherein $Y_4$ is hydroxyl or a radical of the formula:

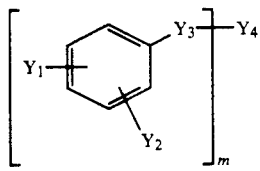
(B)

or

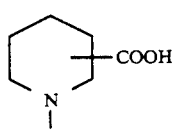
(C)

$Y_3$ is —CO— or —$SO_2$—, $Y_1$ is $C_1$-$C_8$-alkyl, $C_1$-$C_8$-alkoxy or halogen when $Y_4$ is other than hydroxyl, carboxyl when $Y_4$ is hydroxyl, or hydrogen when $Y_4$ is

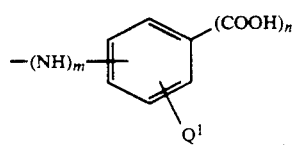
(C)

or $Q^1$ is nitro, or m is 2, $Y_2$ is hydrogen, $C_1$-$C_8$-alkyl, nitro, hydrogen or halogen, $Q^1$ is hydrogen, nitro or halogen, m and n are each 1 or 2.

Specific illustrations of such zinc salts are described in U.S. Pat. No. 4,089,690, which describes the use of zinc 5-nitroisophthalate as a corrosion inhibitor for steel in conventional organic coatings; U.S. Pat. No. 4,830,775, which describes the use of zinc salts of carboxylic acids of the formula:

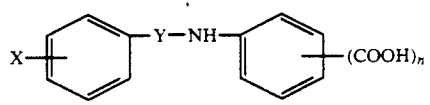

wherein Y is —CO— or —$SO_2$—, X is H or —$NO_2$ and n is 1 or 2; and U.S. Pat. No. 4,999,134, which characterizes the remaining structures encompassed by formulas (A), (B) and (C) above. Particularly preferred zinc salts are zinc 5-nitro isophthalate, zinc 2-benzoyl amino benzoate, zinc di-(2-phenyl sulfonyl amino) benzoate, zinc 5-phenyl sulfonyl amino isophthalate, zinc 4-benzoyl amino benzoate, zinc 3-benzoyl amino benzoate, zinc N-toluene sulfonyl anthranilate, zinc N-toluene sulfonyl amino-3-benzoate, zinc N-toluene sulfonyl amino-4-benzoate, zinc N-benzene sulfonyl piperidine-4-carboxylate, zinc 3,5-di-(benzene sulfonyl amino) benzoate, zinc 5-toluene sulfonyl amino isophthalate, and the like.

The other members of the component I. category are (b) zinc phosphate, and (c) zinc molybdate, The other component of the inhibitor mixture is labeled II. and comprises at least one other and different corrosion inhibitor from the group consisting of i) (2-benzothiazolylthio)succinic acid, and ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof. As noted, the mixture of components I. and II. inhibits the corrosion at the interface of the water-dispersible, modified epoxy resin adhesive primer and the adherend, regardless of the composition of the adherend.

The invention relates to water-dispersible, modified epoxy resin primer composition in which II defined above, may represent combinations of inhibitors comprising:

1. (2-benzothiazolylthio)succinic acid combined with the I. component;
2. a mixture of (2-benzothiazolylthio)succinic acid and calcium silicate on an amorphous gel of silica combined with the I. component;
3. a mixture of a precipitated calcium silicate, zinc iodide, and lithium borate combined with the I component;
4. a mixture of a precipitated calcium silicate, a calcium strontium zinc phosphosilicate, zinc iodide, and lithium borate combined with the I. component;
5. a mixture of zinc iodide and manganese (III) acetate combined with the I. component.
6. bismuth nitrate combined with the I. component;
7. cerium chloride combined with the I. component;
8. cerium molybdate combined with the I. component;
9. sodium thioglycolate combined with the I. component;
10. calcium strontium zinc phosphosilicate combined with the I. component; and
11. a water-dispersible mixture of niobium oxide and cerium molybdate combined with the I. component.

The preferred component II. metal salts are cerium molybdate, sodium thioglycolate, barium tungstate, lithium borate, a calcium silicate on an amorphous gel of silica, and a precipitated calcium silicate. A suitable calcium silicate on an amorphous gel of silica is sold by Davison Chemical Division of W. R. Grace, as Shieldex ®. A suitable precipitated calcium silicate is sold by PPG Industries, Inc., as Inhibisil ®. A suitable (2-Benzothiazolylthio)succinic acid is sold by CibaGeigy Corp. as Irgacor ®.

The amount of corrosion inhibitor in the water-dispersible, modified epoxy resin adhesive bonding primer formulation is not narrowly critical. Adjustments between the amount of components I. and II. and their relative amounts in the formulation may be utilized to fine tune corrosion inhibition and other properties of the primer.

The inhibitor pigment content may range from about 0.5 to about 10 weight percent of the weight of the primer composition. In the case of component I., it may be present in the primer composition in the range of about 0.25 to about 8 weight percent, and component II. may be present in the range of about 0.25 to about 8 weight percent.

The formulations of the water-dispersible, modified epoxy resin and other resins, for the manufacture of the waterborne structural adhesive bonding primer, follows the traditional path. Flow control aids and filler, apart from the corrosion inhibitors, and the like materials are contemplated as additives to the formulation.

The commercial success of a structural adhesive bonding primer is as much dependent upon handling properties as it is on physical properties. Though the utility of the invention is strongly dependent upon the novel combination of the water soluble modified epoxy resin and the combination of corrosion inhibitors as characterized herein, its commercial utility is also dependent on the handling characteristics of the primer during deposition on the adherend surface. For that reason, a coating aid such as a flow leveler may be required in a commercial formulation of the composition of the invention in order to avoid coating attributes as fisheyes, orange peel, blushing, and the like. A variety of such materials are suitable, but the choices are somewhat limited by the fact that the composition contains water. For example, a flow leveler that is incompatible with water and any other component of the primer composition would not be expected to provide flow leveling. A particularly desirable flow leveler for the compositions of this invention is an acrylic polymer that is typically provided for this purpose. Water soluble solvents, also soluble in the composition, may be used to aid in flow control as well. Alkanols containing 1 to about 5 carbon atoms may be used for this purpose. A particularly suitable alkanol is isopropanol. A glycol ether, which is normally a part of the water soluble resin composition, such as the monoalkyl or dialkyl ethers, may be used to assist in flow control. Suitable glycols include ethylene glycol, 1,2-propylene glycol and 1,3-propylene glycol. The monomethyl ethers thereof are particularly useful. Other solvents are suitable. Their selection is dependent upon the specific solubility or dispersability of the water-dispersible, modified epoxy resin in water and whether the water-dispersible, modified epoxy resin is an emulsified component of the formulation.

The structural adhesive bonding primer may be applied to an adherend by any of the coating techniques, including spray coating (conventional and electrostatic), pour coating, dip coating, brushing, and the like. Usually, the higher solids primer compositions are applied by dip and pour coating procedures. The formulations depicted herein are sprayable with a high volume low pressure atomizer.

Typical primer formulations encompassed by the invention are set forth in the following table A, which characterizes the relative concentrations in percent by weight:

TABLE A

| | Example No. | 1 | 2 |
|---|---|---|---|
| Blend #1 | PKHW-35 phenoxy resin | 38.91 | 22.84 |
| | Deionized Water | 38.91 | 38.75 |
| | Resimene ® 747 | 4.00 | — |
| Blend #2 | PKHW-35 phenoxy resin | 6.69 | 6.86 |
| | Deionized Water | 2.79 | 2.86 |
| | Strontium yellow | 1.55 | 1.58 |
| | Paliotol Yellow L1770 | 0.46 | 0.48 |
| Blend #3 | Beetle ® 65 | — | 2.96 |
| | Resimene ® 747 | — | 1.21 |
| | ICI ® R9637 | — | 9.09 |
| | Bayhydrol 121 | — | 6.82 |
| Blend #4 | Foammaster ® NS-1 antifoamer | 0.10 | 0.01 |
| | Deionized Water | 0.78 | 0.08 |
| Blend #5 | A2678M Flow Control Aid | 0.50 | 0.52 |
| | Deionized Water | 0.38 | 0.39 |
| Blend #6 | Nacure ® 2500 | 0.43 | 0.44 |
| | Surfynol ® PSA 204 | 0.50 | 0.42 |
| | Deionized Water | 4.00 | 4.69 |
| | | 100.00 | 100.00 |

Primer Manufacturing Procedure For Examples 1 and 2

Each blend of Examples 1 and 2 is separately made in a Cowles ® mixer under a strong vortex or with a Lightnin ® mixer until appropriate mixture is obtained, except that in the case of Example 2, blends 1 and 3 are combined in a Cowles ® mixer. The mixture of blends 1 and 3, in the case of Example 2, should be followed by thorough mixture with blend 4. Where pigment grind is needed, the grind is effected in a horizontal media mill after the components are first mixed in thoroughly.

Grinds may be otherwise obtained in roller mills, pebble mills, and the like. Then the blends are combined in a Cowles® mixer under a strong vortex.

Properties

1. Primer from Example 1
Storage and outtime stability
  6 months at 40° F. (5° C.)
  30 days at 75° F. (24° C.)
  10 days at 90° F. (32° C.)
Capable of applying up to 0.2 mil (0.005 mm) per box coat
Slow setting rate. Minimum agitation necessary during application.
Application and flash rates similar to solvent borne primers.
May be stored for 6 months after primer cure when protected.
Primer reactivation not required for second-stage bonding. (Surface preparation for rebondability is methyl ethyl ketone (MEK) wipe, light hand abrade (Scotch-Brite®) and MEK clean.)
Meets SCAQMD Rule 1124.
Flash point >200° F. (>93° C.)
Low odor
Easy equipment clean-up with water when primer is wet.
350° F. (176.7° C.) thermal aging stability.
Enhanced toughness.
Flatwise Tensile Strength
  Tested according to BSS 7205 after curing; adherends are 2024 $T_3$ clad aluminum with ¼ inch (6.4 mm) cell 5052 non-perforated aluminum core.

| Test Temperature | | Result |
|---|---|---|
| 75° F. | 24° C. | 1130 psi (7.8 MPa) |
| 350° F. | 176.7° C. | 420 psi (2.9 MPa) |
| 350° F. | 176.7° C. | 380 psi (2.6 MPa) |

(Tested after 1000 Hours Heat Aging at 350° F. (176.7° C.))

Service Temperature-defined as that temperature at which the adhesive still retains 1000 psi (6.9 MPa) using test method ASTM D 1002 and is about 350° F. (176.7° C.) when using Hysol EA 9657 Bonding Adhesive (The Dexter Corporation, Aerospace Materials Division, Pittsburg, CA 94585)

2. Primer from Example 2
Storage and outtime stability
  6 months at 40° F. (5° C.)
  30 days at 75° F. (24° C.)
  10 days at 90° F. (32° C.)
Capable of applying up to 0.2 mil (0.005 mm) per box coat.
Slow setting rate. Minimum agitation necessary during application.
Application and flash rates similar to solvent borne primers.
May be stored for 6 months after primer cure when protected.
Primer reactivation not required for second-stage bonding. (Surface preparation for rebondability is methyl ethyl ketone (MEK) wipe, light hand abrade (Scotch-Brite®) and MEK clean.)
Meets SCAQMD Rule 1124.
Flash point >200° F. (>93° C.)
Low odor
Easy equipment clean-up with water when primer is wet.
250° F. (121° C.) thermal aging stability.
Enhanced toughness.
Flatwise Tensile Strength
  Tested according to BSS 7205, after curing; adherends are 2024 $T_3$ clad aluminum with ¼ inch (6.4 mm) cell 5052 non-perforated aluminum core.

| Test Temperature | | Result |
|---|---|---|
| 75° F. | 24° C. | 1000 psi |
| 180° F. | 82.2° C. | 700 psi |
| 250° F. | 121° C. | 200 psi |

Other mechanical properties:

| Test | | Result |
|---|---|---|
| Wide Area Overlap[7] | | $\overline{X}$ |
| −67° F. | −17.4° C. | 4500 psi |
| 75° F. | 24° C. | 5000 psi |
| 180° F. | 82.2° C. | 4000 psi |
| 250° F. | 121° C. | 2800 psi |
| Metal To Metal Climbing Drum[8] | | 60 in-lbs/inch |
| Honeycomb Climbing Drum[9] | | 55 in-lbs/3 inches |

[7]Tested per BSS 7202.
[8]Tested per BSS 7206
[9]Tested per BSS 7207

I claim:

1. An aqueous structural adhesive bonding primer composition containing a water-dispersible, modified phenoxy resin that has a waterborne polymeric structure and a degree of polymerization of at least 30, an amine aldehyde resin and a catalyst for reacting the epoxy resin and the amine aldehyde resin, which composition when provided as a structural adhesive primer on a solid surface that serves as an adherend for a structural adhesive, protects the adherend surface from being affected by environment, inhibits corrosion of the bonded surface during its service life and provides a compatible surface to which the adhesive can bond for longterm strength.

2. The aqueous structural adhesive bonding primer composition of claim 1 wherein the phenoxy resin contains anionic, cationic or nonionic functional substitution that forms the waterborne polymeric structure.

3. The aqueous structural adhesive bonding primer composition of claim 2 wherein the phenoxy resin contains anionic functional substitution that forms the waterborne polymeric structure.

4. The aqueous structural adhesive bonding primer composition of claim 2 wherein the phenoxy resin contains cationic functional substitution that forms the waterborne polymeric structure.

5. The aqueous structural adhesive bonding primer composition of claim 2 wherein the phenoxy resin contains nonionic functional substitution that forms the waterborne polymeric structure.

6. The aqueous structural adhesive bonding primer composition of claim 2 wherein the phenoxy resin contains grafted acrylyl substitution on the phenoxy resin backbone that provide the anionic, cationic or nonionic substitution thereby forming the waterborne polymeric structure.

7. The aqueous structural adhesive bonding primer composition of claim 2 wherein the grafted acrylyl substitution is derived from the acrylyl compound of the formula:

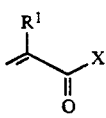

wherein $R^1$ is hydrogen or a lower $C_{1-4}$ alkyl group and X contains an ionically bonded cationic, anionic group or a nonionic group.

8. The aqueous structural adhesive bonding primer composition of claim 7 wherein the grafted acrylyl substitution waterborne phenoxy is derived from acrylyl compounds are the following:

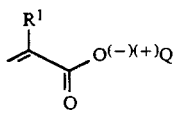

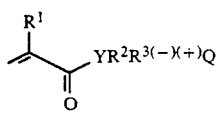

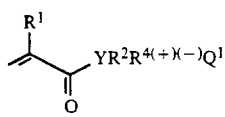

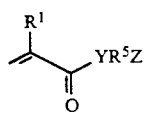

wherein [+]Q is a proton acceptor; Y is either oxygen, sulfur or amino; $R^2$ is a divalent organic group; $R^3$ is a carboxy containing group; $R^4$ is an amine, ammonium, phosphonium, or sulfonium; $R^5$ is poly(alkyleneoxy); and Z is terminal alkyl or hydroxyl.

9. The aqueous structural adhesive bonding primer composition of claim 8 wherein the grafted acrylyl substitution is formed in situ, by grafting the acrylic or methacrylic or other alkyl substituted versions and reacting them with a base or grafting them and then converting the carboxylic group to the acid chloride with a chlorinating reagent followed by reaction with the hydroxyl, mercapto or amino version of the functional group, or an intermediate leading thereto, thereby forming the equivalent waterborne polymeric structure.

10. The aqueous structural adhesive bonding primer composition of claim 2 containing a water-dispersible corrosion inhibitor mixture of components I. and II. in which:

Component I. is at least one of:
(a) a zinc salt of a carboxylic acid of the formula:

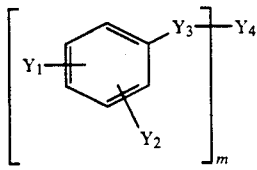

(b) zinc phosphate, and
(c) zinc molybdate,
wherein $Y_4$ is hydroxyl or a radical of the formula:

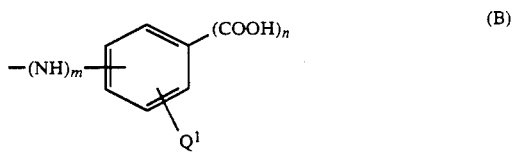

or

$Y_3$ is —CO— or —$SO_2$—, $Y_1$ is $C_1$-$C_8$-alkyl, $C_1$-$C_8$-alkoxy or halogen when $Y_4$ is other than hydroxyl, carboxyl when $Y_4$ is hydroxyl, or hydrogen when $Y_4$ is

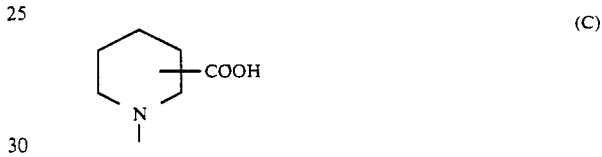

or $Q^1$ is nitro, or m is 2, $Y_2$ is hydrogen, $C_1$-$C_8$-alkyl, nitro, hydrogen or halogen, $Q^1$ is hydrogen, nitro or halogen, m and n are each 1 or 2; and Component II. is at least one other and different corrosion inhibitor from the group consisting of:
  i) (2-benzothiazolylthio)succinic acid, and
  ii) a corrosion inhibitor containing a metal other than chromium, having an atomic number of at least 3 and not greater than 81, from Groups 1, 2, 3, 4, 5, 6, 7 and 12 of the Periodic Table of the Elements (New Notation), and mixtures thereof.

11. The aqueous structural adhesive bonding primer composition of claim 10 wherein component II. is a member from the group consisting of:
  a. (2-benzothiazolylthio)succinic acid;
  b. a mixture of (2-benzothiazolylthio)succinic acid and calcium silicate;
  c. a mixture of a precipitated calcium silicate, zinc iodide, and lithium borate;
  d. a mixture of a precipitated calcium silicate, a calcium strontium zinc phosphosilicate, zinc iodide, and lithium borate;
  e. a mixture of zinc iodide and manganese (III) acetate;
  f. bismuth nitrate;
  g. cerium chloride;
  h. cerium molybdate;
  i. sodium thioglycolate;
  j. calcium strontium zinc phosphosilicate; and
  k. a water-dispersible mixture of niobium oxide and cerium molybdate.

12. The aqueous structural adhesive bonding primer composition of claim 11 wherein component I. is a mixture of zinc 5-nitroisophthalate and zinc phosphate, and component II. is the mixture of (2-benzothiazolylthio)succinic acid and calcium silicate.

13. The aqueous structural adhesive bonding primer composition of claim 11 wherein component I. is a mixture of zinc 5-nitroisophthalate and zinc phosphate, and component II. is cerium molybdate.

14. The aqueous structural adhesive bonding primer composition of claim 11 wherein component I. is zinc 5-nitroisophthalate and component II. is sodium thioglycolate.

15. The aqueous structural adhesive bonding primer composition of claim 10 wherein there is provided a small amount of a chromate corrosion inhibitor.

16. The aqueous structural adhesive bonding primer composition of claim 2 wherein there is provided a small amount of a chromate corrosion inhibitor.

17. An aqueous structural adhesive bonding primer composition containing a water-dispersible, modified phenoxy resin and a water-dispersible corrosion inhibitor comprising a mixture of niobium oxide and cerium molybdate.

* * * * *